(12) United States Patent
Kim

(10) Patent No.: US 6,370,519 B1
(45) Date of Patent: Apr. 9, 2002

(54) METHOD FOR STORING AND DISPLAYING TELEPHONE NUMBERS OF COMMUNICATION TERMINALS

(75) Inventor: Hoo-Ja Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/359,215

(22) Filed: Jul. 22, 1999

(30) Foreign Application Priority Data

Jul. 22, 1998 (KR) .......................................... 98-29547

(51) Int. Cl.[7] .............................................. G06F 17/30
(52) U.S. Cl. ........................... 707/1; 455/403; 379/88.2
(58) Field of Search ................ 707/1, 3, 6; 455/403, 455/566, 464, 567; 379/93.17, 356, 67, 88, 355, 387, 88.2

(56) References Cited

U.S. PATENT DOCUMENTS

| 5,737,392 A | * | 4/1998 | Cheng et al. ................. 379/67 |
| 5,737,394 A | * | 4/1998 | Anderson et al. ............. 379/88 |
| 5,768,362 A | * | 6/1998 | Moon .......................... 379/356 |
| 5,774,540 A | * | 6/1998 | Davidson et al. ............ 379/387 |
| 5,797,098 A | * | 8/1998 | Schroeder et al. ........... 455/464 |
| 5,848,356 A | * | 12/1998 | Jambhekar et al. ......... 455/403 |
| 5,941,930 A | * | 8/1999 | Morimoto et al. ........... 701/201 |
| 6,081,730 A | * | 6/2000 | Lieben et al. ............... 455/557 |
| 6,084,951 A | * | 7/2000 | Smith et al. ............. 379/93.17 |
| 6,108,411 A | * | 8/2000 | Otsuka et al. ............... 379/355 |
| 6,125,287 A | * | 9/2000 | Cushman et al. ........... 455/566 |
| 6,178,338 B1 | * | 1/2001 | Yamagishi et al. ......... 455/566 |

* cited by examiner

Primary Examiner—Sanjiv Shah
(74) Attorney, Agent, or Firm—Dilworth & Barrese, LLP

(57) ABSTRACT

A method for storing telephone numbers of communication terminals. The method includes the steps of receiving a telephone number entered after a telephone number storage mode is selected; checking whether there is name data stored in a specific area of a memory; if the name data is detected, displaying the name data; checking whether any name is selected; if a name is selected, storing the telephone number and the selected name in a first storage area of the memory; and storing the selected name in a second storage area of the memory.

9 Claims, 5 Drawing Sheets

| NAME STORAGE AREA | ~500 |

| PICTURE ICON DATA STORAGE AREA | ~510 |

| ADDRESS | NAME | ICON DATA | TELEPHONE NUMBER |
|---------|------|-----------|------------------|
| 1 | . | . | . |
| 2 | . | . | . |
| 3 | . | . | . |
| ⋮ | ⋮ | ⋮ | ⋮ |

METHOD FOR STORING AND DISPLAYING TELEPHONE NUMBERS OF COMMUNICATION TERMINALS

CLAIM OF PRIORITY

This application makes reference to, incorporates the same herein, and claims all benefits accruing under 35 U.S.C. §119 from an application entitled METHOD FOR STORING AND DISPLAYING TELEPHONE NUMBERS OF COMMUNICATION TERMINALS earlier filed in the Korean Industrial Property Office on Jul. 22, 1998, and there duly assigned Ser. No. 98-29547.

BACKGROUND OF THE INVENTION

1. Field of the Invention

The present invention relates to a method for registering telephone numbers of communication terminals, and more particularly, to a method for storing and displaying a plurality of telephone numbers belonging to the same person.

2. Description of the Related Art

When storing telephone numbers in a communication terminal, a person's name is stored together with a corresponding telephone number. Therefore, even when storing a plurality of telephone numbers belonging to the same person, the user must enter the same name several times. For example, if a person called Tom has four telephone numbers, one each for his home, office, pager, and cellular phone, as listed below in Table 1, the user must repeatedly enter the name "Tom" or "Tom's" to store those telephone numbers.

TABLE 1

| Name | Phone Number |
| --- | --- |
| Tom's home | 02-123-4567 |
| Tom's office | 02-234-5678 |
| Tom's pager | 077-888-9999 |
| Tom's cellular phone | 000-111-2222 |

This requires the user to enter the same person's name several times, thereby requiring numerous redundant keystrokes, and also to enter character data, such as home, office, pager and cellular phone, to classify the telephone numbers.

SUMMARY OF THE INVENTION

It is therefore an object of the present invention to provide a method for reducing the number of key strokes when storing a plurality of telephone numbers belonging to the same person.

It is another object of the present invention to provide a method for displaying telephone numbers so as to be easily recognized by the user when retrieving the telephone numbers.

In accordance with one aspect of the present invention, a method for storing telephone numbers of communication terminals is provided which includes the steps of: receiving a telephone number for processing by a controller, the telephone number being entered by first selecting a telephone number storage mode and subsequently entering the telephone number; checking whether there is pre-registered name data stored in a specific area of a memory; if the pre-registered name data is present, displaying the pre-registered name data; checking whether any name is selected; displaying a plurality of telephone number classification icons, allowing the user to select one; if a name and icon are selected, storing the telephone number, the selected name, and the selected telephone number classification icon in a first storage area of the memory; and storing the selected name in a second storage area of the memory; if a name is not selected from the list of pre-registered name data, allowing entry of a new name by the user and storing the new name in the first and second storage areas as described above, in place of the selected name.

BRIEF DESCRIPTION OF THE DRAWINGS

The above and other objects, features and advantages of the present invention will become more apparent from the following detailed description when taken in conjunction with the accompanying drawings in which:

FIG. 5 is a diagram illustrating a memory map according to the present invention.

DETAILED DESCRIPTION OF THE PREFERRED EMBODIMENT

A preferred embodiment of the present invention will be described hereinbelow with reference to the accompanying drawings. In the following description, numerous specific details are set forth to provide a more thorough understanding of the present invention. It will be apparent, however, to one skilled in the art that the present invention may be practiced without these specific details. In other instances, well known constructions or functions are not described in detail so as not to obscure the present invention.

Figure 1:
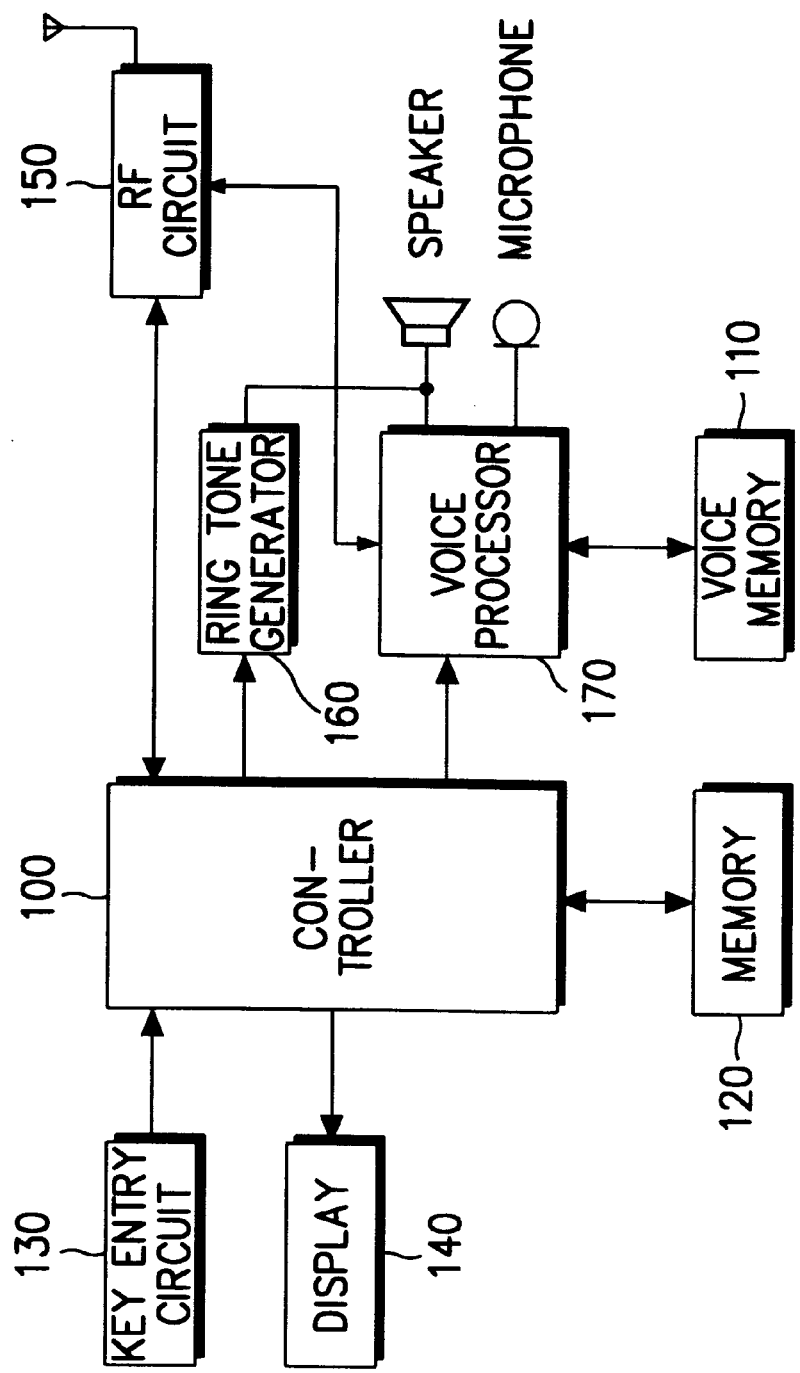
FIG. 1 is a block diagram of a communication terminal to which the present invention is applicable.

Referring to FIG. 1, a controller 100 controls the overall operation of a communication terminal. A memory 120 consists of a read only memory (ROM) for storing an operating program, an electrically erasable and programmable read only memory (EEPROM), and a random access memory (RAM). The memory 120 stores icons for classifying telephone numbers and stores names and icon data corresponding to the telephone numbers. A display 140, preferably a liquid crystal display (LCD), displays the status of the communication terminal or a program procedure under the control of the controller 100. A key entry circuit 130 includes a plurality of numeral and function keys and transmits key data to the controller 100 which is externally generated by a key input. A radio frequency (RF) circuit 150 controlled by the controller 100 transmits data to a base station and converts an RF signal received through an antenna into a corresponding signal. A ring tone generator 160 generates a ring tone under the control of the controller 100 which is output through a speaker. A voice memory 110 stores voice data. A voice processor 170 modulates a voice signal received from a microphone into voice data and demodulates the voice data into the voice signal to be generated through the speaker under the control of controller 110.

Figure 2:
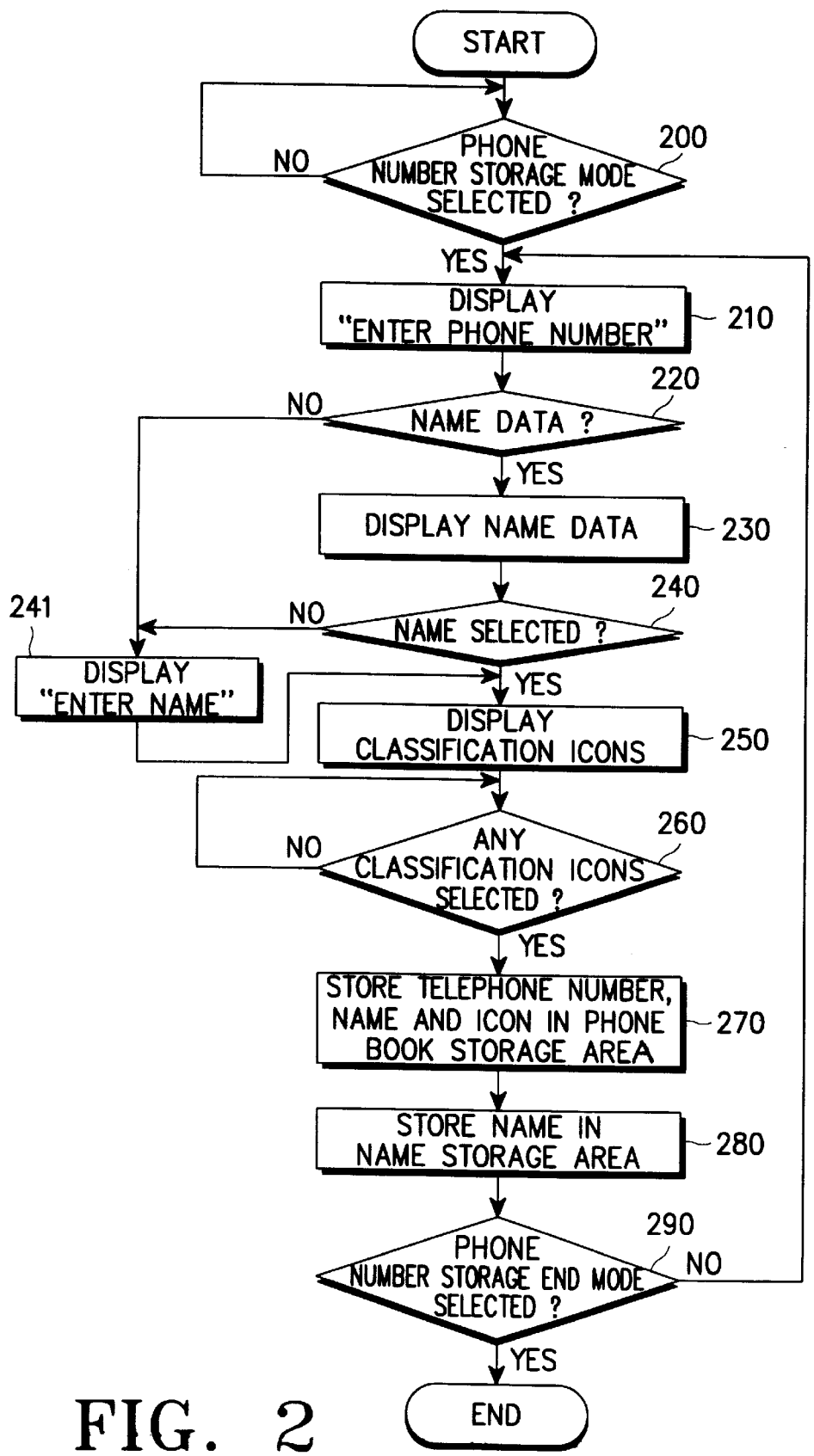
FIG. 2 is a flow chart illustrating a telephone number registering process according to the present invention.

Referring to FIG. 2, a telephone number registering process is illustrated.

At step 200, the controller 100 checks whether a telephone number storage mode, which is initiated by a preset key input from the key entry circuit 130, is selected. The controller 100 waits for the telephone number storage mode to be selected, and if it is detected, the controller 100 causes, at step 210, the display 140 to display a message, for example, "ENTER TELEPHONE NUMBER" so that the user can enter a telephone number. Then the memory 120 temporarily stores key data received through the key entry circuit 130. The controller 100 checks at step 220 whether name data has been pre-registered, and therefore exists at a specific area of the memory 120. Namely, when the user registers a telephone number, the name data entered by the user is stored in a specific area of the memory 120 at step 280 as described below. If the name data is detected, the process proceeds to step 230. If not, it proceeds to step 241, as will be described below.

Upon detecting the presence of the pre-registered name data, which is stored in a specific area of the memory 120, the controller 100 causes the display 140 to display the pre-registered name data at step 230. Generally, pre-registered name data will always be present at a specific area of the memory 120, except when the user selects the telephone number storage mode for the first time or when the communication terminal is reset. At step 240, the controller 100 checks whether one of the displayed names is selected by causing the display 140 to display a message, for example, "SELECT THIS NAME? Y/N". If a key value for selecting a name is entered from the key entry circuit 130 at step 240, the process proceeds to step 250, and if not, it proceeds to step 241.

The following Table 2 depicts an example of a list of names displayed on the display 140, allowing the user to select a name. In Table 2, "◆" designates a position of a cursor.

TABLE 2

| Tom |
| James |
| Jane |
| . |
| . |
| . |

Although the above example depicts a plurality of names stored in the memory 120 in the reverse order of entry, it is also possible to display only the latest entered name, or to display the names in alphabetical order.

Alternatively, if there is no pre-registered name data stored in a specific area of the memory 120 at step 220, a message, for example, "ENTER NAME" is displayed at step 241. The memory 120 temporarily stores name data received through the key entry circuit 130.

Figure 3:
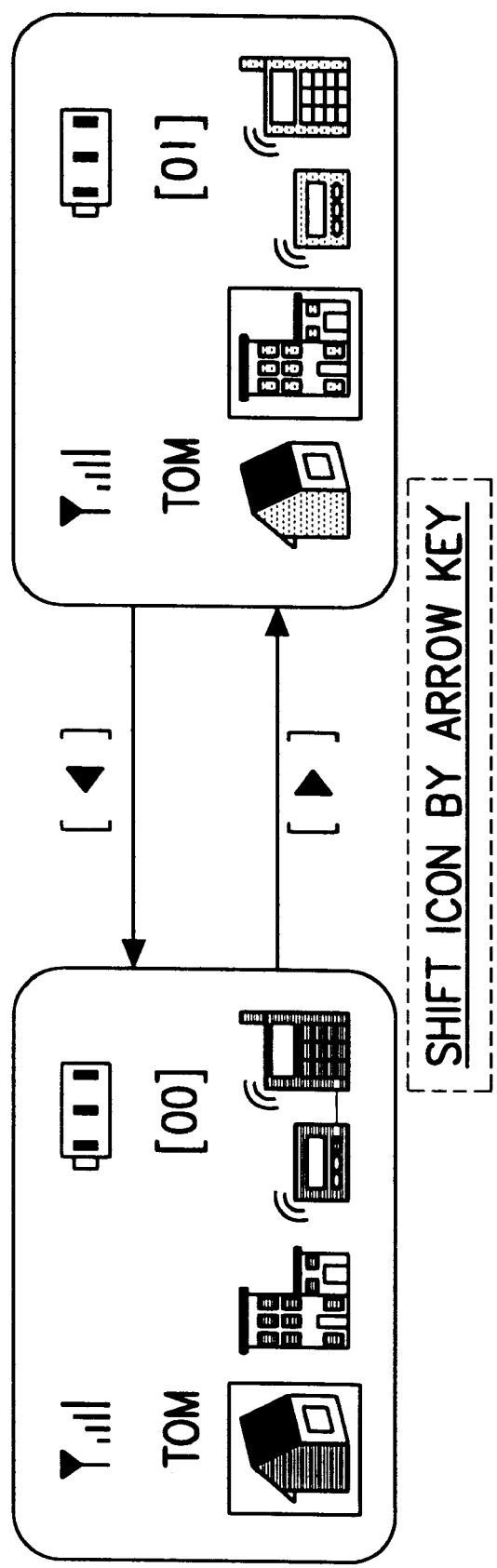
FIG. 3 is a diagram of a display device of a communication terminal illustrating telephone number classification icons according to the present invention.

At step 250, telephone number classification icons are displayed, as shown in FIG. 3. Referring to FIG. 3, the first, second, third and fourth icons designate home, office, pager and cellular phone respectively. A square shape enclosing the first icon is preferably used to Indicate a position of a cursor. The user can shift the position of the cursor by using arrow keys to select the desired icon. At step 260, the controller 100 checks whether one of the telephone number classification icons is selected. If one of them is selected, the entered telephone number at step 210, entered or selected name at step 241 or 240 and selected icon at step 260 are stored at step 270 in a phone book storage area 520 of the memory 120 as illustrated in FIG. 5. The stored icon is not a picture but data representing the icon. Table 3 below depicts a memory map.

TABLE 3

| Address | Name | Icon | Phone Number |
| --- | --- | --- | --- |
| 1 | Tom | Home | 02-123-4567 |
| 2 | Tom | Office | 02-234-5678 |
| 3 | Tom | Pager | 077-888-9999 |
| 4 | Tom | Cellular Phone | 000-111-2222 |
| 5 | James | Home | 02-123-4568 |
| 6 | James | Office | 02-234-5679 |
| 7 | James | Pager | 077-888-9990 |
| 8 | James | Cellular Phone | 000-111-2221 |

While in the Icon column of Table 3 the name of the icon is listed, for example, home, office, pager, cellular phone, etc., the classification icon listed in Table 3 corresponds to data representing each icon, while the icon itself represents home, office, pager and so on. More particularly, data "00" corresponding to the home icon, and data "01" corresponding to the office icon, etc., is stored in this section and the picture icons are stored in a picture icon storage data area 510, as illustrated in FIG. 5, of the memory 120.

At step 280, the name stored in the phone book storage area 520 is further stored in a name storage area 500 of the memory 120 as indicated in FIG. 5. When the user registers a telephone number by selecting the telephone number storage mode, the name data stored in the name storage area 500 of the memory 120 will be displayed on the display 140. At step 290, the controller 100 checks whether a telephone number storage end mode is selected. If it is selected, the process is ended, and if not, the process returns to step 210.

Figure 4:
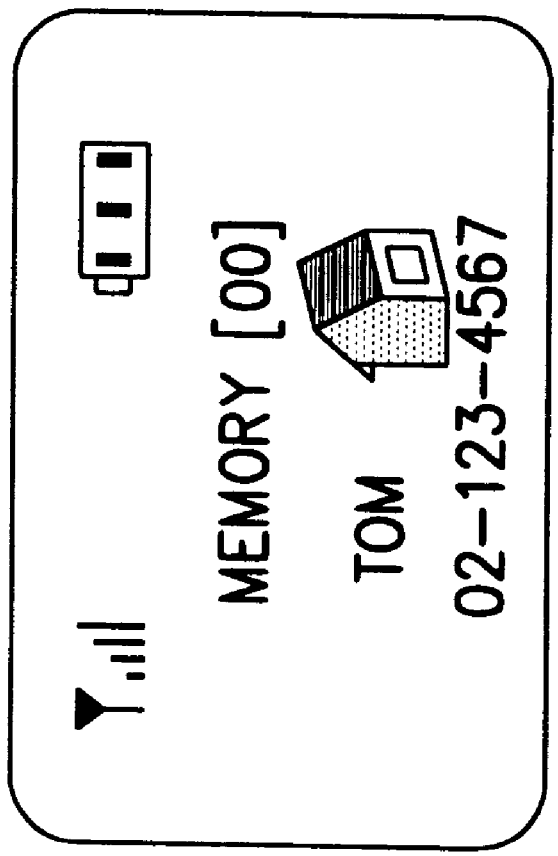
FIG. 4 is a diagram of a display device when a telephone number retrieval mode is selected according to the present invention.

If a telephone number retrieval mode is selected after the telephone number storage end mode is selected, the controller 100 accesses the name, icon and telephone number from the memory 120 to display them through the display 140 as illustrated in FIG. 4.

As described above, there is no need to repeatedly enter the same name whenever telephone numbers belonging to the same person are successively registered, thereby eliminating redundancy.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for storing telephone numbers in a communication terminal, the method comprising:

entering a telephone number storage mode in said communication terminal;

inputting a telephone number to said terminal when said terminal is in the telephone number storage mode;

determining whether there is pre-registered name data in a first storage area of a memory of said terminal;

if pre-registered name data is in the memory, then displaying the pre-registered name data;

determining, by a user of the terminal, if any of the pre-registered name data corresponds with the input telephone number;

if the pre-registered name data corresponds with the telephone number, then selecting the pre-registered name data and the telephone number;

storing the selected pre-registered name data and the telephone number in a second storage area of the memory; and re-storing the selected pre-registered name data in the first storage area of the memory.

2. The method of claim 1, wherein if the selected pre-registered name data corresponds with the telephone number, further comprising the steps of displaying icons for classifying a plurality of telephone numbers;

selecting one of the icons by the user; and storing the telephone number, the selected pre-registered name data and the selected icon in the second storage area of the memory.

3. The method of claim 2, wherein the icons for classifying a plurality of telephone numbers are selected from the group consisting of home, office, pager and cellular phone icons.

4. The method of claim 2, wherein the icons are selected by moving a cursor until it surrounds the desired icon.

5. The method of claim 1, wherein if the selected pre-registered name data does not correspond with the telephone number, further comprising the steps of entering a name by the user;

displaying icons for classifying a plurality of telephone numbers;

selecting one of the icons by the user; and storing the telephone number, the name entered and the selected icon in the second storage area of the memory.

6. The method of claim 5, wherein the icons for classifying a plurality of telephone numbers are selected from the group consisting of home, office, pager and cellular phone icons.

7. The method of claim 5, wherein the icons are selected by moving a cursor until it surrounds the desired icon.

8. A method for storing telephone numbers in a communication terminal having a memory consisting of a first storage area for storing names, a second storage area for storing icons to be displayed on a display, a third storage area for storing icons, names and telephone numbers, and a fourth storage area for storing a last entered name, the method comprising:

entering a telephone number storage mode in said communication terminal;

inputting a telephone number to said terminal when said terminal is in said telephone number storage mode;

displaying the last entered name stored in the fourth storage area;

determining, by the user, if the last entered name displayed corresponds to the input telephone number;

if the last entered name corresponds to the input telephone number, displaying icons stored in the second storage area;

selecting a displayed icon to correspond to the last entered name and the input telephone number;

storing the icon, name and number in the third storage area;

storing the icon in the second storage area; and storing the name in the first and fourth storage areas.

9. The method of claim 8, wherein the icons are selected by moving a cursor until it surrounds the displayed icon.

* * * * *